(12) United States Patent
Chen et al.

(10) Patent No.: US 11,618,865 B2
(45) Date of Patent: Apr. 4, 2023

(54) OIL AND FAT COMPOSITION, USE THEREOF AND FOOD COMPRISING THE SAME

(71) Applicant: Wilmar (Shanghai) Biotechnology Research & Development Center Co., Ltd., Shanghai (CN)

(72) Inventors: Xiang Chen, Shanghai (CN); Yan Zheng, Shanghai (CN); Yongqing Chi, Shanghai (CN)

(73) Assignee: Wilmar (Shanghai) Biotechnology Research & Development Center Co., Ltd., Shanghai (CN)

( * ) Notice: Subject to any disclaimer, the term of this patent is extended or adjusted under 35 U.S.C. 154(b) by 305 days.

(21) Appl. No.: 16/957,618

(22) PCT Filed: Dec. 24, 2018

(86) PCT No.: PCT/CN2018/123117
§ 371 (c)(1),
(2) Date: Jun. 24, 2020

(87) PCT Pub. No.: WO2019/128925
PCT Pub. Date: Jul. 4, 2019

(65) Prior Publication Data
US 2020/0332223 A1    Oct. 22, 2020

(30) Foreign Application Priority Data
Dec. 26, 2017   (CN) .......................... 201711430246.2

(51) Int. Cl.
| | | |
|---|---|---|
| *C11C 3/06* | (2006.01) | |
| *A23L 33/115* | (2016.01) | |
| *A23G 1/36* | (2006.01) | |
| *C11C 3/10* | (2006.01) | |

(52) U.S. Cl.
CPC ................ *C11C 3/06* (2013.01); *A23G 1/36* (2013.01); *A23L 33/115* (2016.08); *C11C 3/10* (2013.01)

(58) Field of Classification Search
CPC .... C11C 3/06; C11C 3/10; A23G 1/36; A23L 33/115; A23L 27/72; A23D 9/00; A23D 9/013; C11B 3/001; C11B 3/10; C11B 3/12
See application file for complete search history.

(56) References Cited

U.S. PATENT DOCUMENTS

| | | |
|---|---|---|
| 5,654,018 A | 8/1997 | Cain et al. |
| 6,123,979 A | 9/2000 | Hepburn et al. |

FOREIGN PATENT DOCUMENTS

| | | | | |
|---|---|---|---|---|
| CN | 102634547 A | | 8/2012 | |
| CN | 102892301 A | * | 1/2013 | ......... A21D 13/0016 |
| CN | 102892301 A | | 1/2013 | |
| EP | 0276548 A1 | | 8/1988 | |
| EP | 0717931 A2 | | 6/1996 | |
| JP | S63240745 A | | 10/1988 | |
| RU | 2373812 C2 | | 11/2009 | |
| RU | 2443119 C2 | | 2/2012 | |
| RU | 2559435 C2 | | 8/2015 | |

OTHER PUBLICATIONS

English translation of CN 102892301A (Year: 2013).*
Hachiya et al., Seeding Effects on Solidification Behavior of Cocoa Butter and Dark Chocolate. II. Physical Properties of Dark Chocolate, Journal of the American Oil Chemists' Society, 1989, 66(12):1763-1770.
Yuzhe et al., Polymorphic Manufacture of Symmetry Triglyceides BOB, Journal of the Chinese Cereals and Oils Association, 1998, 13(5):119-21.
PCT International Search Report and Written Opinion, PCT/CN2018/123117, dated Mar. 22, 2019, 14 pages.

* cited by examiner

*Primary Examiner* — Deborah D Carr
(74) *Attorney, Agent, or Firm* — Quarles & Brady LLP

(57) ABSTRACT

The present disclosure relates to an oil and fat composition, use thereof and a food comprising the oil and fat composition. The oil and fat composition of the disclosure comprises 50-99.5 wt % triglyceride and 0.5-50 wt % wax by the total weight of the composition, the triglyceride is represented by the following formula (1), and the definitions of the groups in formula (1) are as recorded in the description. The oil and fat composition is suitable for preparation of a food.

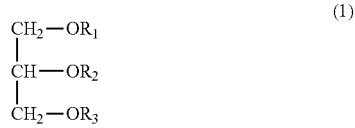

(1)

20 Claims, No Drawings

OIL AND FAT COMPOSITION, USE THEREOF AND FOOD COMPRISING THE SAME

CROSS-REFERENCE TO RELATED APPLICATIONS

This application represents the U.S. national stage entry of International Application No. PCT/CN2018/123117 filed Dec. 24, 2018, which claims priority to Chinese Patent Application No. 201711430246.2 filed Dec. 26, 2017, the disclosure of which is incorporated herein by reference in its entirety and for all purposes.

TECHNICAL FIELD

This disclosure relates to an oil and fat composition, a food comprising the oil and fat composition and use of the oil and fat composition.

BACKGROUND

In the production of chocolate, tempering is essential in obtaining high quality chocolate. Tempering process affects many qualities of chocolate, such as glossiness, brittleness, texture, heat sensitivity and bloom resistance. By temperature change and mechanical processing, chocolate tempering process makes the cocoa butter in chocolate form the stable crystal (V-type crystal) with proper number and size in proper time, therefore the cocoa butter can crystallize rapidly in the stable crystal form during subsequent cooling and solidification process. Chocolate tempering process in industry is a complex and expensive process, which increases the cost of production.

The final purpose of the tempering process is to obtain high quality chocolate by producing stable crystals. The tempering process can be simplified by adding seed crystals, which accelerates the production of the stable crystals and improves the demoulding ability, bloom resistance and glossiness of chocolate. At present, the used seed crystals are divided into cocoa butter seed crystals and triglyceride seed crystals. Cocoa butter seed crystals refer to V- and VI-crystal cocoa butter, and triglyceride seed crystals mainly refer to β2- and β1-StOSt (triglycerides having 1,3-stearic acid residues and 2-oleic acid residue) and BOB (triglycerides having 1,3-behenic acid residues and 2-oleic acid residue). Iwao Hachiya et al. studied the effect of seed crystals on the crystallization and quality of cocoa butter and chocolate. Adding VI-cocoa butter, β1-StOSt and β2-BOB can promote the cocoa butter and chocolate to crystallize and solidify as V-type crystal, and improve the demoulding ability and bloom resistance, wherein β2-BOB has the best effect. Pseudo-β'-BOB can improve the demoulding ability, but cannot improve the bloom resistance, while β-StStSt (triglycerides having 1,2,3-stearic acid residues) can neither improve the demoulding ability, nor improve the bloom resistance. β2 of BOB can promote the cocoa butter to crystallize in V-crystals. When used as a seed crystal in the chocolate tempering process, β2-BOB can greatly improve the demoulding ability and bloom resistance of chocolate, and simplify or even omit the chocolate tempering process. (Iwao Hachiya, Tetsuo Koyano and Kiyotaka Sato, *Seeding effects on solidification behavior of cocoa butter and dark chocolate. II. physical properties of dark chocolate* [J].JAOCS, 1989,66(12):1763-1770). U.S. Pat. No. 5,654,018 disclosed a method for the preparation of a triglyceride rich in behenic acid. The triglyceride does not require that much high BOB content, and its crystal form is mainly β'-form. The triglyceride is to be used in the field of food, but is not for chocolate. JP-A 63-240745 (CN87107818) disclosed a chocolate additive and use of the additive for the production of chocolate. The additive comprises powdery stable crystalline particles mainly consisted of SUS, wherein the unsaturated fatty acid part of SUS has more than 18 carbon atoms and the saturated fatty acid part has 20-24 carbon atoms. According to JP-A 63-240745, the additive can effectively omit or simplify the tempering treatment process in chocolate production, while effectively produces thermal stable chocolate. JP254503/1994 (CN95107742.2) provided a chocolate having a softening point of 15-30° C., wherein the fat composition of the chocolate comprises at least 40 wt % (weight) SUS-rich fat. The main saturated fatty acid part of the glyceride has 16-18 carbon atoms, and the SUS (triglycerides having 1,3-saturated fatty acid residues having at least 14 carbon atoms, and 2-unsaturated fatty acid residue having at least 16 carbon atoms) stable crystal has 20-24 carbon atoms.

Adding seed crystals in the chocolate tempering process is of great significance to optimize the chocolate processing technology and improve the quality of chocolate products. However, it is found that the seed crystals in the art, such as seed crystals of V-form and IV-form of cocoa butter, β2-form and β1-form of SOS and β2-form of BOB, need special crystal preparation, storage and addition process with strict requirements (such as process temperature, particle size and dispersity). Although the seed crystals in the art can omit the tempering process of chocolate, the production and use of the seed crystals is complex. Therefore, there remains a need for more effective seed crystal and use thereof to simplify the chocolate preparation process and improve the quality of chocolate products.

SUMMARY OF THE DISCLOSURE

The present disclosure provides a composition which does not need seed crystals of specific crystal forms and can be obtained by mixing specific oil and fat with wax in a specific proportion, which can omit the tempering process and simplify the operation. Also provided is use of the composition in food (such as tempering chocolate), and the obtained product (such as chocolate product) has good bloom resistance and demoulding ability. The disclosure provides an oil and fat composition, wherein the composition comprises 50-99.5 wt % triglyceride and 0.5-50 wt % wax by the total weight of the composition, the triglyceride is represented by the following formula

(1)

in formula (1), $R_1$, $R_2$ and $R_3$ each are identical or different, and $R_1$, $R_2$ and $R_3$ refer to groups derived from straight-chain or branched-chain, saturated or unsaturated fatty acids having 12-28 carbon atoms, wherein at least one of $R_1$, $R_2$ and $R_3$ refers to a group derived from a straight-chain or branched-chain, saturated or unsaturated fatty acid having 12-28 carbon atoms.

The composition according to the disclosure comprises 55-95 wt % triglyceride by the total weight of the composition.

The composition according to the disclosure comprises 60-90 wt % triglyceride by the total weight of the composition.

The composition according to the disclosure comprises 5-45 wt % wax by the total weight of the composition.

The composition according to the disclosure comprises 10-40 wt % wax by the total weight of the composition.

According to the composition of the disclosure, the wax is at least one of natural waxes, semi-synthetic waxes or synthetic waxes.

According to the composition of the disclosure, the natural wax is an animal wax or a plant wax; the synthetic wax is a chemically or enzymatically synthetic wax ester.

According to the composition of the disclosure, the wax is at least one selected from the group consisting of a bran wax, a sunflower wax, a beeswax, a candelilla wax, a carnauba wax, a nut wax and a fruit wax.

According to the composition of the disclosure, the wax meets the requirement that the weight ratio of wax esters (Wes)/alkanes (HCs) is ≥1, and the carbon atom numbers of the alkanes are 15-27.

According to the composition of the disclosure, the wax meets the requirement that the weight ratio of wax esters (Wes)/alkanes (HCs) is greater than 1.

According to the composition of the disclosure, the wax meets the requirement that the weight ratio of wax esters (Wes)/alkanes (HCs) is 1-30.

According to the composition of the disclosure, the wax meets the requirement that the weight ratio of wax esters (Wes)/alkanes (HCs) is 2-28.

According to the composition of the disclosure, the wax meets the requirement that the total amount of fatty acids (FAs) and fatty alcohols (FALs) is less than 15 wt %.

According to the composition of the disclosure, the wax meets the requirement that the total amount of fatty acids (FAs) and fatty alcohols (FALs) is less than 10 wt %.

According to the composition of the disclosure, the wax meets the requirement that the total amount of fatty acids (FAs) and fatty alcohols (FALs) is less than 7 wt %.

According to the composition of the disclosure, in formula (1), $R_2$ refers to a group derived from a straight-chain or branched-chain, unsaturated fatty acid having a carbon atom number of 12-28, and $R_1$ and $R_3$ independently refer to groups derived from straight-chain or branched-chain, saturated fatty acids having a carbon atom number of 12-28.

According to the composition of the disclosure, in formula (1), $R_2$ refers to a group derived from a straight-chain, unsaturated fatty acid having a carbon atom number of 16-20, and $R_1$ and $R_3$ independently refer to groups derived from straight-chain, saturated fatty acids having a carbon atom number of 18-24.

According to the composition of the disclosure, in formula (1), the total carbon atom number in $R_1$, $R_2$ and $R_3$ is 36-84.

According to the composition of the disclosure, in formula (1), the total carbon atom number in $R_1$, $R_2$ and $R_3$ is 52-68.

According to the composition of the disclosure, in formula (1), the total carbon atom number in $R_1$, $R_2$ and $R_3$ is 62.

According to the composition of the disclosure, in the triglyceride, the content of the fatty acid-derived groups having a total carbon atom number of 62 in $R_1$, $R_2$ and $R_3$ is equal to or more than 65 wt % by the total weight of the triglyceride.

According to the composition of the disclosure, in the triglyceride, the content of the fatty acid-derived groups having a total carbon atom number of 62 in $R_1$, $R_2$ and $R_3$ is 68-95 wt % by the total weight of the triglyceride.

According to the composition of the disclosure, in the triglyceride, the content of the fatty acid-derived groups having a total carbon atom number of 62 in $R_1$, $R_2$ and $R_3$ is 70-88 wt % by the total weight of the triglyceride.

According to the composition of the disclosure, in the triglyceride, the content of the fatty acid-derived groups having a total carbon atom number of 52-60 in $R_1$, $R_2$ and $R_3$ is 0-25 wt % by the total weight of the triglyceride.

According to the composition of the disclosure, in the triglyceride, the content of the fatty acid-derived groups having a total carbon atom number of 52-60 in $R_1$, $R_2$ and $R_3$ is 5-23 wt % by the total weight of the triglyceride.

According to the composition of the disclosure, in the triglyceride, the total content of the fatty acid-derived groups having a total carbon atom number of 64 in $R_1$, $R_2$ and $R_3$ and having a total carbon atom number of 66 in $R_1$, $R_2$ and $R_3$ is less than 5 wt % by the total weight of the triglyceride.

According to the composition of the disclosure, in the triglyceride, the total content of the fatty acid-derived groups having a total carbon atom number of 64 in $R_1$, $R_2$ and $R_3$ and having a total carbon atom number of 66 in $R_1$, $R_2$ and $R_3$ is less than 4.5 wt % by the total weight of the triglyceride.

According to the composition of the disclosure, in the triglyceride, the content of the saturated fatty acid-derived groups having a carbon atom number of 22 is 55-72 wt % by the total weight of the triglyceride.

According to the composition of the disclosure, in the triglyceride, the content of the saturated fatty acid-derived groups having a carbon atom number of 22 is 60-70 wt % by the total weight of the triglyceride.

According to the composition of the disclosure, in the triglyceride, the content of diglyceride is less than 10 wt % by the total weight of the triglyceride.

According to the composition of the disclosure, in the triglyceride, the content of diglyceride is less than 5 wt % by the total weight of the triglyceride.

According to the composition of the disclosure, in formula (1), $R_2$ refers to a group derived from oleic acid, and $R_1$ and $R_3$ independently refer to groups derived from behenic acid.

According to the composition of the disclosure, the triglyceride is obtained by a method comprising a transesterification step.

According to the composition of the disclosure, the transesterification is a chemical transesterification or an enzymatic transesterification.

According to the composition of the disclosure, the transesterification step is conducted by a triglyceride and a fatty acid or a derivative thereof in the presence of an immobilized lipase.

According to the composition of the disclosure, the method also comprises: a molecular distillation step, which is conducted before or after the transesterification step.

According to the composition of the disclosure, the method also comprises: a fractionation step, which is selected from a dry fractionation step or a solvent fractionation step.

According to the composition of the disclosure, the method also comprises: a refining step.

According to the composition of the disclosure, the fatty acid is at least one selected from the group consisting of straight-chain saturated fatty acids having a carbon atom number of 12-28.

According to the composition of the disclosure, the fatty acid derivative is at least one selected from the group consisting of esters formed from a straight-chain saturated fatty acid having a carbon atom number of 12-28 and an alcohol having a carbon atom number of 1-6.

According to the composition of the disclosure, the fatty acid or a derivative thereof is at least one of behenic acid, methyl behenate or ethyl behenate.

According to the composition of the disclosure, the triglyceride is derived from a plant, derived from an animal, or obtained by modification of oils and fats derived from a plant or an animal.

According to the composition of the disclosure, the triglyceride is derived from at least one of rice oil, sunflower seed oil, rape oil, palm oil, palm kernel oil, peanut oil, rapeseed oil, soybean oil, cottonseed oil, safflower seed oil, perilla seed oil, tea seed oil, olive oil, cocoa bean oil, tallowtree seed oil, almond oil, apricot kernel oil, tung seed oil, rubber seed oil, corn oil, wheat germ oil, sesame seed oil, castor seed oil, evening primrose seed oil, hazelnut oil, pumpkin seed oil, walnut oil, grape seed oil, borage seed oil, seabuckthorn seed oil, tomato seed oil, macadamia oil, coconut oil, cocoa butter or algae oil.

According to the composition of the disclosure, the triglyceride is derived from an oil and fat having a high content of oleic acid.

According to the composition of the disclosure, the oil and fat having a high content of oleic acid is at least one selected from the group consisting of high oleic sunflower seed oil, high oleic rapeseed oil or high oleic palm oil.

According to the composition of the disclosure, the triglyceride is derived from deep sea fish oil.

According to the composition of the disclosure, the triglyceride is derived from at least one of salmon oil or sardine oil.

According to the composition of the disclosure, the composition consists of 50-99.5 wt % triglyceride and 0.5-50 wt % wax.

The disclosure provides a food comprising the above composition of the disclosure.

According to the food of the disclosure, with respect to 100 parts by weight of the total weight of the food, the composition is 0.01-15 parts by weight.

According to the food of the disclosure, with respect to 100 parts by weight of the total weight of the food, the composition is 0.05-10 parts by weight.

According to the food of the disclosure, with respect to 100 parts by weight of the total weight of the food, the composition is 0.1-5 parts by weight.

According to the food of the disclosure, the food is a food comprising cocoa butter and/or a cocoa butter equivalent.

The food according to the disclosure also comprises 30-50 parts by weight of the cocoa butter and/or cocoa butter equivalent, with respect to 100 parts by weight of the total weight of the food.

The food according to the disclosure also comprises 10-20 parts by weight of cocoa powder, 30-50 parts by weight of sugar and 0.1-5 parts by weight of phospholipid, with respect to 100 parts by weight of the total weight of the food.

According to the food of the disclosure, the food is chocolate or a food comprising chocolate.

The food according to the disclosure comprises 0.01-15 parts by weight of the composition, with respect to 100 parts by weight of the total weight of the cocoa butter and/or cocoa butter equivalent in the food.

The food according to the disclosure comprises 0.05-10 parts by weight of the composition, with respect to 100 parts by weight of the total weight of the cocoa butter and/or cocoa butter equivalent in the food.

The food according to the disclosure comprises 0.1-5 parts by weight of the composition, with respect to 100 parts by weight of the total weight of the cocoa butter and/or cocoa butter equivalent in the food.

The disclosure provides use of the composition of the disclosure in the preparation of a food.

According to the use of the disclosure, the food is chocolate or a food comprising chocolate.

Effect of the Disclosure

The composition of the disclosure does not need seed crystals of specific crystal forms and can be obtained by mixing specific oil and fat with wax in a specific proportion, which can omit the tempering process and simplify the operation. By using the composition in food (such as tempering chocolate), the obtained product (such as chocolate product) has good bloom resistance and demoulding ability.

DETAILED DESCRIPTION

Oil and Fat Composition

The oil and fat composition of the disclosure is characterized in that it comprises 50-99.5 wt % triglyceride and 0.5-50 wt % wax by the total weight of the composition, the triglyceride is represented by the following formula (1),

in formula (1), $R_1$, $R_2$ and $R_3$ each are identical or different, and $R_1$, $R_2$ and $R_3$ refer to groups derived from straight-chain or branched-chain, saturated or unsaturated fatty acids having a carbon atom number of 12-28, wherein at least one of $R_1$, $R_2$ and $R_3$ refers to a group derived from a straight-chain or branched-chain, saturated or unsaturated fatty acid having a carbon atom number of 12-28.

Examples of the groups derived from straight-chain or branched-chain, saturated or unsaturated fatty acids having a carbon atom number of 12-28 include the groups derived from lauric acid, myristic acid, palmitic acid, stearic acid, palmitoleic acid, oleic acid, linoleic acid, linolenic acid, eicosatrienoic acid, octadecatetraenoic acid, arachidic acid, arachidonic acid, eicosapentaenoic acid, docosahexaenoic acid, behenic acid, tetracosanoic acid, etc.

In the disclosure, a group derived from a fatty acid refers to the residue obtained by removing the hydroxyl from the fatty acid.

In a preferred embodiment of the disclosure, in formula (1), $R_2$ refers to a group derived from a straight-chain or branched-chain, unsaturated fatty acid having a carbon atom number of 12-28, and $R_1$ and $R_3$ independently refer to groups derived from straight-chain or branched-chain, saturated fatty acids having a carbon atom number of 12-28.

In a preferred embodiment of the disclosure, in formula (1), $R_2$ refers to a group derived from a straight-chain unsaturated fatty acid having a carbon atom number of 16-20, and $R_1$ and $R_3$ independently refer to groups derived from straight-chain saturated fatty acids having a carbon atom number of 18-24.

In specific embodiments of the disclosure, in formula (1), $R_2$ refers to a group derived from oleic acid, and $R_1$ and $R_3$ independently refer to groups derived from behenic acid. In these embodiments, the formula (1) can be expressed as BOB oil and fat, wherein O refers to oleic acid and B refers to behenic acid.

The composition of the disclosure comprises 55-95 wt % triglyceride by the total weight of the composition, preferably 60-90 wt % triglyceride by the total weight of the composition. In specific embodiments of the disclosure, the composition comprises 60 wt %, 70 wt %, 75 wt % or 80 wt % triglyceride by the total weight of the composition.

The wax is at least one of natural waxes, semi-synthetic waxes or synthetic waxes. The natural waxes are animal waxes or plant waxes; the synthetic wax is a chemically or enzymatically synthetic wax ester. The plant wax is at least one selected from the group consisting of a bran wax, a sunflower wax, a beeswax, a candelilla wax, a carnauba wax, a nut wax and a fruit wax.

The composition of the disclosure comprises 5-45 wt % wax by the total weight of the composition, preferably 10-40 wt % wax by the total weight of the composition. In specific embodiments of the disclosure, the composition comprises 20 wt %, 25 wt %, 30 wt % or 40 wt % wax by the total weight of the composition.

The wax meets the requirement that the weight ratio of wax esters (Wes)/alkanes (HCs) is ≥1; preferably the wax meets the requirement that the weight ratio of wax esters (Wes)/alkanes (HCs) is more than 1; more preferably the wax meets the requirement that the weight ratio of wax esters (Wes)/alkanes (HCs) is 1-30; particularly preferably the wax meets the requirement that the weight ratio of wax esters (Wes)/alkanes (HCs) is 2-28. In specific embodiments of the disclosure, the wax meets the requirement that the weight ratio of wax esters (Wes)/alkanes (HCs) is 2.6, 3.1, 5.5 or 25.2. The carbon atom numbers of the alkanes are 15-27.

Wax ester is an ester formed by a long-chain higher fatty acid and a higher fatty alcohol, the higher fatty acid is a fatty acid residue having 14-26 carbon atoms, and the higher fatty alcohol is a fatty alcohol residue having 18-38 carbon atoms.

The wax may be a natural wax, a semi-synthetic wax or a synthetic wax; the natural wax is a animal wax or a plant wax; the synthetic wax is a chemically or enzymatically synthetic wax ester; the wax may also be a mixture of two or more of the above waxes.

The wax meets the requirement that the total amount of fatty acids (FAs) and fatty alcohols (FALs) is less than 15 wt %; preferably the wax meets the requirement that the total amount of fatty acids (FAs) and fatty alcohols (FALs) is less than 10 wt %; more preferably the wax meets the requirement that the total amount of fatty acids (FAs) and fatty alcohols (FALs) is less than 7 wt %. In specific embodiments of the disclosure, the wax meets the requirement that the total amount of fatty acids (FAs) and fatty alcohols (FALs) is 3.1 wt %, 4.4 wt %, 6.0 wt % or 6.4 wt %.

In an embodiment of the disclosure, the composition of the disclosure consists of 50-99.5 wt % triglyceride and 0.5-50 wt % wax.

In formula (1), the total carbon atom number in $R_1$, $R_2$ and $R_3$ is 36-84; preferably in formula (1), the total carbon atom number in $R_1$, $R_2$ and $R_3$ is 52-68. In a specific embodiment of the disclosure, in formula (1), the total carbon atom number in $R_1$, $R_2$ and $R_3$ is 62.

In the triglyceride, the content of the fatty acid-derived groups having a total carbon atom number of 62 in $R_1$, $R_2$ and $R_3$ is equal to or more than 65 wt % by the total weight of the triglyceride; preferably in the triglyceride, the content of the fatty acid-derived groups having a total carbon atom number of 62 in $R_1$, $R_2$ and $R_3$ is 68-95 wt % by the total weight of the triglyceride; more preferably in the triglyceride, the content of the fatty acid-derived groups having a total carbon atom number of 62 in $R_1$, $R_2$ and $R_3$ is 70-88 wt % by the total weight of the triglyceride. In specific embodiments of the disclosure, in the triglyceride, the content of the fatty acid-derived groups having a total carbon atom number of 62 in $R_1$, $R_2$ and $R_3$ is 70.9 wt %, 82.3 wt %, 83.3 wt % or 85.1 wt % by the total weight of the triglyceride.

In the triglyceride, the content of the fatty acid-derived groups having a total carbon atom number of 52-60 in $R_1$, $R_2$ and $R_3$ is 0-25 wt % by the total weight of the triglyceride; preferably in the triglyceride, the content of the fatty acid-derived groups having a total carbon atom number of 52-60 in $R_1$, $R_2$ and $R_3$ is 5-23 wt % by the total weight of the triglyceride. In specific embodiments of the disclosure, in the triglyceride, the content of the fatty acid-derived groups having a total carbon atom number of 52-60 in $R_1$, $R_2$ and $R_3$ is 8.2 wt %, 9.7 wt %, 13.4 wt % or 22.8 wt % by the total weight of the triglyceride.

In the triglyceride, the total content of the fatty acid-derived groups having a total carbon atom number of 64 in $R_1$, $R_2$ and $R_3$ and having a total carbon atom number of 64 in $R_1$, $R_2$ and $R_3$ is less than 5 wt % by the total weight of the triglyceride; preferably in the triglyceride, the content of the fatty acid-derived groups having a total carbon atom number of 64 in $R_1$, $R_2$ and $R_3$ and having a total carbon atom number of 66 in $R_1$, $R_2$ and $R_3$ is less than 4.5 wt % by the total weight of the triglyceride. In specific embodiments of the disclosure, in the triglyceride, the content of the fatty acid-derived groups having a total carbon atom number of 64 in $R_1$, $R_2$ and $R_3$ and having a total carbon atom number of 66 in $R_1$, $R_2$ and $R_3$ is 2.3 wt %, 2.4 wt %, 3.7 wt % or 4.5 wt % by the total weight of the triglyceride.

In the triglyceride, the content of the group derived from the saturated fatty acid having a carbon atom number of 22 is 55-72 wt % by the total weight of the triglyceride; preferably in the triglyceride, the content of the group derived from the saturated fatty acid having a carbon atom number of 22 is 60-70 wt % by the total weight of the triglyceride. In specific embodiments of the disclosure, in the triglyceride, the content of the group derived from the saturated fatty acid having a carbon atom number of 22 is 63.9 wt %, 66.3 wt %, 67.3 wt % or 67.9 wt % by the total weight of the triglyceride.

In the disclosure, C52, C54, C56, C58, C60, C62, C64 and C66 respectively refer to the sum of the carbon atom numbers in all the fatty acid residues of the triglyceride, which is the sum of the carbon atom numbers of $R_1$, $R_2$ and $R_3$ in formula (1).

In the triglyceride, the content of diglyceride is less than 10 wt % by the total weight of the triglyceride; preferably in the triglyceride, the content of diglyceride is less than 5 wt % by the total weight of the triglyceride. In specific embodiments of the disclosure, in the triglyceride, the content of diglyceride is 2.0 wt %, 2.6 wt %, 2.8 wt % or 4.0 wt % by the total weight of the triglyceride.

In the disclosure, the triglyceride may be obtained by a method comprising a transesterification step. The transesterification is not specifically limited, for example, may be chemical transesterification or enzymatic transesterification. The transesterification step is conducted by a triglyceride and a fatty acid or a derivative thereof in the presence of an immobilized lipase. The fatty acid is at least one selected from the group consisting of straight-chain saturated fatty acids having a carbon atom number of 12-28. The fatty acid derivative is at least one selected from the group consisting of esters formed from a straight-chain saturated fatty acid having a carbon atom number of 12-28 and an alcohol having a carbon atom number of 1-6. In specific embodiments of the disclosure, the fatty acid or a derivative thereof is at least one of behenic acid, methyl behenate or ethyl behenate.

The chemical transesterification step is performed, for example, by drying the raw material oils and fats under vacuum with heating, and adding catalyst with warming. The heating is conducted, for example, at 90-120° C., e.g. at 105° C.; the dehydration is conducted, for example, for 0.5-2 hours, e.g. for 1 hour. After the catalyst is added, the reaction is preferably conducted at 80-110° C., such as at 100° C., for 0.1-2 hours, such as 0.5 hours, and then cooled to 60-80° C., such as 70° C. in vacuum.

The catalyst is at least one selected from the group consisting of hydroxide, carbonate, bicarbonate and alkoxide of alkali metal or alkaline earth metal. The hydroxide of alkali metal or alkaline earth metal is at least one selected from the group consisting of KOH, NaOH and $Ca(OH)_2$. The carbonate of alkali metal is at least one selected from the group consisting of $K_2CO_3$ and $Na2CO_3$. The bicarbonate of alkali metal is at least one selected from the group consisting of $KHCO_3$ and $NaHCO_3$. The alkoxide of alkali metal is such as $NaOCH_3$.

In the disclosure, the amount of the catalyst added is 0.1-3.0 wt %, preferably 0.3-2 wt %, more preferably 0.5-1 wt % by the total weight of the oil and fat and the raw material oils and fats.

The reaction of the chemical transesterification step is preferably terminated by a terminator. Examples of the terminator include organic acid or inorganic acid. Examples of the organic acid include citric acid, tartaric acid, etc. Examples of the inorganic acid include hydrochloric acid, phosphoric acid, sulfuric acid, etc. The terminator is preferably citric acid. The amount of the terminator added is not specifically limited, provided that the reaction can be terminated. For example, the terminator can be added in an amount of 0.5-3 wt %, such as 1wt %, by the total weight of the raw material oils and fats.

In the step of enzymatic transesterification, the transesterification is performed by contacting a lipase with the reactant or by passing the reactant through a packed bed containing immobilized lipases according to the conventional method.

In addition to the transesterification step, the method for preparing the triglyceride also comprises: a molecular distillation step, which is conducted before or after the transesterification step; and/or also comprises: a fractionation step, which is selected from a dry fractionation step or a solvent fractionation step; and/or also comprises: a refining step. These steps may be performed according to the conventional method provided that the effect of the disclosure is not impaired.

In the disclosure, the triglyceride is derived from a plant, derived from an animal, or obtained by modification of the oils and fats derived from a plant or an animal.

In the disclosure, the triglyceride is derived from at least one of rice oil, sunflower seed oil, rape oil, palm oil, palm kernel oil, peanut oil, rapeseed oil, soybean oil, cottonseed oil, safflower seed oil, perilla seed oil, tea seed oil, olive oil, cocoa bean oil, tallowtree seed oil, almond oil, apricot kernel oil, tung seed oil, rubber seed oil, corn oil, wheat germ oil, sesame seed oil, castor seed oil, evening primrose seed oil, hazelnut oil, pumpkin seed oil, walnut oil, grape seed oil, borage seed oil, seabuckthorn seed oil, tomato seed oil, macadamia oil, coconut oil, cocoa butter or algae oil. Preferably, the triglyceride is derived from an oil and fat having a high content of oleic acid. In a preferred embodiment of the disclosure, the oil and fat having a high content of oleic acid is at least one selected from the group consisting of high oleic sunflower seed oil, high oleic rapeseed oil and high oleic palm oil. The triglyceride is derived from deep sea fish oil, such as salmon oil, sardine oil, etc. The triglyceride also may be obtained by modification of the above plant-derived oils or animal-derived oils by conventional methods (for example, oil modification processes such as transesterification, extraction or blending).

Food

The disclosure provides a food comprising the above composition of the disclosure. With respect to 100 parts by weight of the total weight of the food, the composition is 0.01-15 parts by weight; preferably with respect to 100 parts by weight of the total weight of the food, the composition is 0.05-10 parts by weight; more preferably with respect to 100 parts by weight of the total weight of the food, the composition is 0.1-5 parts by weight.

The food is a food comprising cocoa butter and/or a cocoa butter equivalent and/or a cocoa butter replacer. In a preferred embodiment of the disclosure, the food also comprises 30-50 parts by weight of the cocoa butter and/or cocoa butter equivalent and/or cocoa butter replacer, with respect to 100 parts by weight of the total weight of the food.

In a preferred embodiment of the disclosure, the food also comprises 10-20 parts by weight of cocoa powder, 30-50 parts by weight of sugar and 0.1-5 parts by weight of phospholipid, with respect to 100 parts by weight of the total weight of the food.

In a preferred embodiment of the disclosure, the food comprises 0.01-15 parts by weight, preferably 0.05-10 parts by weight, more preferably 0.1-5 parts by weight, of the composition of the disclosure, with respect to 100 parts by weight of the total weight of the cocoa butter and/or cocoa butter equivalent and/or cocoa butter replacer in the food.

The food is chocolate or a food comprising chocolate.

Use

The composition of the disclosure is used for preparation of a food. The food is chocolate or a food comprising chocolate.

EXAMPLES

The following examples are used to further describe the disclosure, but the content of the disclosure is not limited by the following content. The embodiments in the description of the disclosure are only used to describe the disclosure and not to limit the protection scope of the disclosure. The protection scope of the disclosure is only limited by the claims. Any omission, replacement or modification made by those skilled in the art on the basis of the embodiment of the disclosure will fall into the protection scope of the disclosure.

Conventional instruments and equipment in the art were used in the following examples. The experimental methods without specifying the specific conditions in the following examples generally used the conventional conditions or followed the manufacturer's recommendation. Unless otherwise described, the raw materials used in the following examples are conventional commercially available products. Unless specifically described, in the description and the following examples of the disclosure, "%" refers to percentage by weight.

High oleic sunflower seed oil and shea butter fractionated stearine Shea ST (StOSt content: 71.2%, StOSt: triglycerides with 1,3-St and 2-O) were purchased from Yihai Kerry Marketing Co., Ltd., methyl behenate was purchased from Sichuan SIPO Chemical Co., Ltd., rice bran wax, sunflower wax, beeswax and candelilla wax, carnauba wax, etc., were purchased from Beijing Likang Weiye Technology Co., Ltd., NS40086 was purchased from Novozyme (China) Investment Co., Ltd., cocoa butter and cocoa powder were purchased from Archer Daniels Midland Co., Ltd., white granulated sugar was purchased from Korea CJ First Sugar Co., Ltd., and acetone and n-hexane were purchased from Sinopharm Group Chemical Reagent Co., Ltd.

Determination method for fatty acid composition: AOCS ce1-62; determination method for triglyceride composition: AOCS ce5-86.

Example 1

Preparation of BOB Oil and Fat
Enzymatic Transesterification
500 g high oleic sunflower seed oil and 900 g methyl behenate were heated and mixed, and placed in a 2 L three-necked glass flask, 10% (by weight of the substrate) NS40086 immobilized enzyme was added, and the mixture was reacted at 70° C. for 4 h. The liquid was collected when the reaction was finished, and the enzyme was left in the three-necked flask for continuous use. Crude reaction product I was collected and to be purified.

Purification of Triglyceride by Molecular Distillation
The above crude reaction product I was purified by molecular distillation at a distillation temperature of 230° C., a rotating speed of 300 r/min and a vacuum degree of $1 \times 10^{-3}$ mbar to remove substances such as fatty acids, monoglycerides or diglycerides, and triglyceride mixture II was obtained.

Solvent Fractionation
300 g triglyceride mixture II was added to 5-fold volume of n-hexane by the weight of the oil and fat, and the mixture was heated to clear, placed in a 55° C. water bath kettle for 15 min, cooled to 20° C. and kept for 2 h. The high-melting-point solid part was removed by filtration and the liquid phase was obtained. The liquid phase was heated to clear, kept at 20° C. for 15 min, then cooled to 14° C. and kept for 3 h, and filtrated to obtain the solid.

Oil and Fat Refining
Acetone in the above solid part was removed for 0.5 h using a rotary evaporator at 60° C., a rotating speed of 80 r/min, and a vacuum degree of 10 mbar. Then dehydration was conducted at 90° C. and a vacuum degree of 10 mbar for 0.5 h. At last, bleaching and deodorization were conducted. The bleaching was conducted at 105° C. and a vacuum degree of 10 mbar with adding about 2% white clay by the weight of the oil as a decolorizing adsorbent. Filtration was conducted after bleaching for 0.5 h. The deodorization was conducted for 2 h at 230° C. and at a vacuum degree of 5 mbar with injecting nitrogen. BOB oil and fat product having a C62 content of 82.3% was obtained after refining.

Preparation of the Composition
0.75 part by weight of the BOB oil and fat product having a C62 content of 82.3% and 0.25 part by weight of a mixture of the sunflower wax and candelilla wax (mass ratio: 7:3) were mixed for 30 min at 80° C. with magnetic stirring at 500 r/min for later use.

Example 2

Preparation of BOB Oil and Fat
Enzymatic Transesterification
500 g high oleic sunflower seed oil and 1000 g methyl behenate were heated and mixed, and placed in a 2 L three-necked glass flask, 10% (by weight of the substrate) of NS40086 immobilized enzyme was added, and the mixture was reacted at 70° C. for 4 h. The liquid was collected when the reaction was finished, and the enzyme was left in the three-necked flask for continuous use. Crude reaction product I was collected and to be purified.

Purification of Triglyceride by Molecular Distillation
The above crude reaction product I was purified by molecular distillation at a distillation temperature of 230° C., a rotating speed of 300 r/min and a vacuum degree of $1 \times 10^{-3}$ mbar to remove substances such as fatty acids, monoglycerides or diglycerides, and triglyceride mixture II was obtained.

Solvent Fractionation
300 g triglyceride mixture II was added to 4-fold volume of n-hexane by the weight of the oil and fat, and the mixture was heated to clear, placed in a 55° C. water bath kettle for 15 min, cooled to 20° C. and kept for 2 h. The high-melting-point solid part was removed by filtration and the liquid phase was obtained. The liquid phase was heated to clear, kept at 20° C. for 15 min, then cooled to 16° C. and kept for 3 h, and filtrated to obtain the solid.

Oil and Fat Refining
Acetone in the above solid part was removed for 0.5 h using a rotary evaporator at 60° C., a rotating speed of 80 r/min and a vacuum degree of 10 mbar. Then dehydration was conducted at 90° C. and a vacuum degree of 10 mbar for 0.5 h. At last, bleaching and deodorization were conducted. The bleaching was conducted at 105° C. and at a vacuum degree of 10 mbar, with adding about 2% white clay by the weight of the oil as a decolorizing adsorbent. Filtration was conducted after bleaching for 0.5 h. The deodorization was conducted for 2 h at 230° C. and at a vacuum degree of 5 mbar with injecting nitrogen. BOB oil and fat product having a C62 content of 85.1% was obtained after refining.

Preparation of the Composition
0.7 part by weight of the BOB oil and fat product having a C62 content of 85.1% and 0.3 part by weight of a mixture of the beeswax and rice bran wax (mass ratio: 5:5) were mixed for 30 min at 80° C. with magnetic stirring at 500 r/min for later use.

Example 3

Preparation of BOB Oil and Fat
Enzymatic Transesterification
500 g high oleic sunflower seed oil and 900 g methyl behenate were heated and mixed, and placed in a 2 L three-necked glass flask, 8% (by weight of the substrate) of NS40086 immobilized enzyme was added, and the mixture was reacted at 70° C. for 4 h. The liquid was collected when the reaction was finished, and the enzyme was left in the three-necked flask for continuous use. Crude reaction product I was collected and to be purified.

Purification of Triglyceride by Molecular Distillation
The above crude reaction product I was purified by molecular distillation at 230° C., a rotating speed of 300 r/min and a vacuum degree of 1×10⁻³ mbar to remove substances such as fatty acids, monoglycerides or diglycerides, and triglyceride mixture II was obtained.

Solvent Fractionation 300 g triglyceride mixture II was added to 5-fold volume of n-hexane by the weight of the triglyceride, and the mixture was heated to clear, placed in a 55° C. water bath kettle for 15 min, cooled to 20° C. and kept for 2 h. The high-melting-point solid part was removed by filtration and the liquid phase was obtained. The liquid phase was heated to clear, kept at 20° C. for 15 min, then cooled to 13° C. and kept for 3 h, and filtrated to obtain the solid.

Oil and Fat Refining

Acetone in the above solid part was removed for 0.5 h using a rotary evaporator at 60° C., a rotating speed of 80 r/min and a vacuum degree of 10 mbar. Then dehydration was conducted at 90° C. and a vacuum degree of 10 mbar for 0.5 h. At last, bleaching and deodorization were conducted. The bleaching was conducted at 105° C. and at a vacuum degree of 10 mbar, with adding about 2% white clay by the weight of the oil as a decolorizing adsorbent. Filtration was conducted after bleaching for 0.5 h. The deodorization was conducted for 2 h at 230° C. and at a vacuum degree of 5 mbar with injecting nitrogen. BOB oil and fat product having a C62 content of 70.9% was obtained after refining.

Preparation of the Composition 0.8 part by weight of the BOB oil and fat product having a C62 content of 70.9% and 0.2 part by weight of a mixture of the rice bran wax and beeswax (mass ratio: 9:1) were mixed at 80° C. for 30 min with magnetic stirring at 500 r/min for later use.

Example 4

Preparation of BOB Oil and Fat

Enzymatic Transesterification 500 g high oleic sunflower seed oil and 900 g methyl behenate were heated and mixed, and placed in a 2 L three-necked glass flask, 8% (by weight of the substrate) of NS40086 immobilized enzyme was added, and the mixture was reacted at 70° C. for 4 h. The liquid was collected when the reaction was finished, and the enzyme was left in the three-necked flask for continuous use. Crude reaction product I was collected and to be purified.

Purification of Triglyceride by Molecular Distillation

The above crude reaction product I was purified by molecular distillation at a distillation temperature of 230° C., a rotating speed of 300 r/min and a vacuum degree of 1×10⁻³ mbar to remove substances such as fatty acids, monoglycerides or diglycerides, and triglyceride mixture II was obtained.

Solvent Fractionation 300 g triglyceride mixture II was added to 5-fold volume of n-hexane by the weight of the triglyceride, and the mixture was heated to clear, placed in a 55° C. water bath kettle for 15 min, cooled to 20° C. and kept for 2 h. The high-melting-point solid part was removed by filtration and the liquid phase was obtained. The liquid phase was heated to clear, kept at 20° C. for 15 min, then cooled to 13° C. and kept for 3 h, and filtrated to obtain the solid.

Oil and Fat Refining

Acetone in the above solid part was removed for 0.5 h using a rotary evaporator at 60° C., a rotating speed of 80 r/min and a vacuum degree of 10 mbar. Then dehydration was conducted at 90° C. and a vacuum degree of 10 mbar for 0.5 h. At last, bleaching and deodorization were conducted. The bleaching was conducted at 105° C. and at a vacuum degree of 10 mar, with adding about 2% white clay by the weight of the oil as decolorizing adsorbent. Filtration was conducted after bleaching for 0.5 h. The deodorization was conducted for 2 h at 230° C. and at a vacuum degree of 5 mbar, with injecting nitrogen. BOB oil and fat product having a C62 content of 83.3% was obtained after refining.

Preparation of the Composition 0.6 part by weight of the BOB oil and fat product having a C62 content of 83.3% and 0.4 part by weight of a mixture of the beeswax and sunflower wax (mass ratio: 8:2) were mixed at 80° C. for 30 min with magnetic stirring at 500 r/min for later use.

Comparative Example 1

The BOB oil and fat prepared in Example 2 was used.

Preparation of the Composition 0.7 part by weight of the BOB oil and fat product having a C62 content of 85.1% and 0.3 part by weight of a mixture of the carnauba wax, rice bran wax and candelilla wax (mass ratio: 4:4:2) were mixed at 80° C. for 30 min with magnetic stirring at 500 r/min for later use.

Comparative Example 2

The BOB oil and fat prepared in Example 2 was used.

Preparation of the composition: 0.7 part by weight of the BOB oil and fat product having a C62 content of 85.1% and 0.3 part by weight of a mixture of the candelilla wax and beeswax (mass ratio: 6:4) were mixed at 80° C. for 30 min with magnetic stirring at 500 r/min for later use.

Comparative Example 3

Preparation of BOB Oil and Fat

Enzymatic Transesterification 500 g high oleic sunflower seed oil and 900 g methyl behenate were heated and mixed, and placed in a 2 L three-necked glass flask, 8% (by weight of the substrate) of NS40086 immobilized enzyme was added, and the mixture was reacted at 70° C. for 4 h. The liquid was collected when the reaction was finished, and the enzyme was left in the three-necked flask for continuous use. Crude reaction product I was collected and to be purified.

Purification of Triglyceride by Molecular Distillation

The above crude reaction product I was purified by molecular distillation at a distillation temperature of 230° C., a rotating speed of 300 r/min and a vacuum degree of 1×10⁻³ mbar to remove substances such as fatty acids, monoglycerides or diglycerides, and triglyceride mixture II was obtained.

Solvent Fractionation 300 g triglyceride mixture II was added to 5-fold volume of n-hexane by the weight of the triglyceride, and the mixture was heated to clear, placed in a 55° C. water bath kettle for 15 min, cooled to 16° C. and kept for 2 h. The high-melting-point solid part was removed by filtration and the liquid phase was obtained. The liquid phase was heated to clear, kept at 16° C. for 15 min, then cooled to 5° C. and kept for 3 h, and filtrated to obtain the solid.

Oil and Fat Refining

Acetone in the above solid part was removed for 0.5 h using a rotary evaporator at 60° C., a rotating speed of 80 r/min and a vacuum degree of 10 mbar. Then dehydration was conducted at 90° C. and a vacuum degree of 10 mbar for 0.5 h. At last, bleaching and deodorization were conducted. The bleaching was conducted at 105° C. and at a vacuum degree of 10 mar, with adding about 2% white clay by the weight of the oil as decolorizing adsorbent. Filtration was conducted after bleaching for 0.5 h. The deodorization was conducted for 2 h at 230° C. and at a vacuum degree of 5 mbar, with injecting nitrogen. BOB oil and fat product having a C62 content of 55.8% was obtained after refining.

Preparation of the Composition 0.7 part by weight of the BOB oil and fat product having a C62 content of 55.8% and 0.3 part by weight of a mixture of the beeswax and rice bran wax (mass ratio: 5:5) were mixed at 80° C. for 30 min with magnetic stirring at 500 r/min for later use.

Comparative Example 4

The BOB oil and fat prepared in Example 2 was used.
Preparation of the Composition 1.0 part by weight of the BOB oil and fat product having a C62 content of 85.1% and 0 part by weight of a wax mixture were mixed at 80° C. for 30 min with magnetic stirring at 500 r/min for later use.

Comparative Example 5

Preparation of the Composition 0 part by weight of the BOB oil and fat and 1.0 part by weight of a mixture of the beeswax and rice bran wax (mass ratio: 5:5) were mixed at 80° C. for 30 min with magnetic stirring at 500 r/min for later use.

Comparative Example 6

The BOB oil and fat prepared in Example 4 was used, and BOB oil and fat β2-form seed crystal was prepared according to Wang Yuze et al. Study on the production of polycrystalline of symmetrical triglyceride BOB [J]. *Journal of China Grain and oil journal*, 1998,13 (5): 19-21.

The BOB oil and fat β2-form seed crystal was added with liquid nitrogen and smashed by universal pulverizer, sieved with 100 mesh sieve and collected for later use.

Comparative Example 7

The preparation and use of the BOB oil and fat β2-form seed crystal were the same as that of Comparative Example 6, and the wax was prepared according to Example 4.

Comparative Example 8
Solvent Fractionation 300 g Shea ST was added to 4-fold volume of acetone by the weight of the oil and fat, the mixture was heated to clear, placed in a 55° C. water bath kettle for 15 min, cooled to 24° C. and kept for 2 h. The high-melting-point solid part was removed by filtration and the liquid phase was obtained. The liquid phase was heated to clear, kept at 24° C. for 15 min, then cooled to 5° C. and kept for 2 h, and filtrated to obtain the solid.

Oil and Fat Refining

Acetone in the above solid was removed for 0.5 h using a rotary evaporator at 60° C., a rotating speed of 80 r/min, and a vacuum degree of 10 mbar. Then dehydration was conducted at 90° C. and a vacuum degree of 10 mbar for 0.5 h. At last, bleaching and deodorization were conducted. The bleaching was conducted at 105° C. and at a vacuum degree of 10 mar, with adding about 2% white clay by the weight of the oil as a decolorizing adsorbent. Filtration was conducted after bleaching for 0.5 h. The deodorization was conducted for 2 h at 230° C. and at a vacuum degree of 5 mbar, with injecting nitrogen. A product was obtained after refining.

Preparation of the Composition 0.7 part by weight of the oil and fat product having a StOSt content of 86.5% and 0.3 part by weight of a mixture of the beeswax and rice bran wax (mass ratio: 5:5) were mixed at 80° C. for 30 min with magnetic stirring at 500 r/min for later use.

Comparative Example 1 is to study the effect of different FAs+ FALs.

Comparative Example 2 is to study the effect of different WEs/HCs.

Comparative Example 3 is to study the effect of different BOB oil and fat purity.

Comparative Example 4 is to study the effect of BOB oil and fat alone.

Comparative Example 5 is to study the effect of wax alone.

Comparative Example 6 is to study the effect of adding BOB β2 seed crystal alone.

Comparative Example 7 is to study the synergistic effect of adding BOB β2 seed crystal and wax.

Comparative Example 8 is to study the synergistic effect of glyceride having high-purity StOSt (86.5%) and wax; the oil and fat having high-purity StOSt was obtained from Shea ST by acetone fractionation.

Comparative Example 9 is to study the effect of cocoa butter paste containing wax on non-tempered chocolate block.

Comparative Example 10 is conventional marble-tempered pure-cocoa butter chocolate block.

TABLE 1

Composition analysis of Examples and Comparative Examples

| | Example | | | | Comparative Example | | | | | | | | | |
|---|---|---|---|---|---|---|---|---|---|---|---|---|---|---|
| | 1 | 2 | 3 | 4 | 1 | 2 | 3 | 4 | 5 | 6 | 7 | 8 | 9 | 10 |
| BOB oil and fat (part by weight) | 0.75 | 0.7 | 0.8 | 0.6 | 0.7 | 0.7 | 0.7 | 1.0 | 0.0 | 1.0 | 0.6 | 0.6 | 0.0 | — |
| C62 (%) | 82.3 | 85.1 | 70.9 | 83.3 | 85.1 | 85.1 | 55.8 | 85.1 | — | 83.3 | 83.3 | SOS | CB | CB |
| C52~C60 (%) | 13.4 | 9.7 | 22.8 | 8.2 | 9.7 | 9.7 | 35.9 | 9.7 | — | 8.2 | 8.2 | 86.5 | non-tempered | marble-tempered |
| C64 + C66 (%) | 2.3 | 2.4 | 3.7 | 4.5 | 2.4 | 2.4 | 4.2 | 2.4 | — | 4.5 | 4.5 | | | |
| DAG (%) | 2.0 | 2.8 | 2.6 | 4.0 | 2.8 | 2.8 | 4.1 | 2.8 | — | 4.0 | 4.0 | | | |
| C22:0 (%) | 67.9 | 66.3 | 63.9 | 67.3 | 66.3 | 66.3 | 48.9 | 66.3 | — | 67.3 | 67.3 | | | |
| Wax (part by weight) | 0.25 | 0.3 | 0.2 | 0.4 | 0.3 | 0.3 | 0.3 | — | 1.0 | — | 0.4 | 0.4 | 1.0 | — |
| WEs/HCs | 3.1 | 5.5 | 25.2 | 2.6 | 5.5 | 0.5 | 5.5 | — | 5.5 | — | 2.6 | 5.5 | 5.5 | — |
| FAs + FALs (%) | 4.4 | 6.4 | 3.1 | 6.0 | 23.3 | 3.9 | 6.4 | — | 6.4 | — | 6.0 | 6.4 | 6.4 | — |

In Table 1, C52, C54, C56, C58, C60, C62, C64 and C66 respectively refer to the sum of the carbon atom numbers of all the fatty acid residues in the triglyceride. C62 (%) refers to the content of the groups having a total carbon atom number of 62 in $R_1$, $R_2$ and $R_3$ in formula (1); C52~C60 (%) refers to the content of the fatty acid-derived groups having a total carbon atom number of 52-60 in $R_1$, $R_2$ and $R_3$ in formula (1); C64+C66 (%) refers to the total content of the fatty acid-derived groups having a total carbon atom number of 64 in $R_1$, $R_2$ and $R_3$ and having a total carbon atom number of 66 in $R_1$, $R_2$ and $R_3$ in formula (1), DAG (%) refers to the content of diglyceride in the BOB oil and fat, and C22:0 (%) refers to the content of the group derived from a saturated fatty acid having a carbon atom number of 22 in the triglyceride.

APPLICATION EXAMPLES

Chocolate blocks were prepared by using the compositions in Examples 1-4 and Comparative Examples 1-10 and according to the formulation shown in Table 2 and the following chocolate preparation method.

TABLE 2

| Chocolate formulation | |
|---|---|
| Material | ratio |
| Cocoa powder | 14.5% |
| Sugar powder | 41.65% |
| Cocoa butter | 43.35% |
| Compositions of Examples 1-4 and Comparative Examples 1-10 | See Table 3 |
| Phospholipid | 0.5% |

TABLE 3

| | Application Example | | | | Comparative Application Example | | | | | | | | | |
|---|---|---|---|---|---|---|---|---|---|---|---|---|---|---|
| Composition | 1 | 2 | 3 | 4 | 1 | 2 | 3 | 4 | 5 | 6 | 7 | 8 | 9 | 10 |
| Added amount (%) | 0.5 | 2.0 | 2.0 | 5.0 | 2.0 | 2.0 | 2.0 | 5.0 | 5.0 | 5.0 | 5.0 | 5.0 | 5.0 | — |

Note: the added amount is calculated according to the amount of cocoa butter in Table 2.

Milling of chocolate paste: The ball mill was washed with soybean oil and then washed with cocoa butter, until the effluent from the ball mill was cool and clear. According to the formulation in Table 2 and Table 3, each material was weighed accurately, and the powders (cocoa powder and sugar powder) and the oil sample (cocoa butter) were weighed respectively. During milling, the ball mill temperature was set at 55° C. The ball mill was adjusted to the first gear, and the powders were mixed and added to the ball mill, while ¾ of the oil sample was added to the ball mill; then the ball mill was adjusted to the third gear and the milling was conducted for 5 min; then the ball mill was adjusted to the seventh gear and the milling was conducted for 30 min. The phospholipid and the remaining oil sample were weighed according to the formulation, mixed and added to the ball mill, and milled for 10 min. Then the milling was finished and the milled paste was discharged.

Preparation of Chocolate

To obtain the chocolate paste, the milled paste was placed in a 55° C. oven to completely melt the crystals formed due to cooling.

Application Examples 1-4 and Comparative Application Examples 1-5, 8 and 9

The chocolate paste was cooled to 33° C., and added with 0.5-5 wt % of the composition (the compositions of Examples 1-4 and Comparative Examples 1-10) by the weight of the cocoa butter in the whole chocolate formulation according to Table 3. The materials were mixed, and the paste was at 33° C. and ready for casting.

Comparative Application Example 6

The chocolate paste was cooled to 33° C., and added with 5 wt % of the BOB seed crystal powder by the weight of the cocoa butter in the whole chocolate formulation. The materials were mixed, and the paste was at 33° C. and ready for casting.

Comparative Application Example 7

The chocolate paste was cooled to 33° C., and added with 3 wt % of the BOB seed crystal powder and 2 wt % of a mixture of the beeswax and rice bran wax by the weight of the cocoa butter in the whole chocolate formulation. The materials were mixed, and the paste was at 33° C. and ready for casting.

Comparative Application Example 10

Preparation of marble-tempered chocolate block: Pure-cocoa butter chocolate Preparation, chocolate block was prepared according to the chocolate formulation in Table 2 and Table 3 using marble-tempering. In the tempering step, the chocolate paste was cooled to 40-45° C., then ⅓ of the chocolate paste was placed on a marble operation platform and was quickly spread on the marble operation platform using a spatula. The chocolate paste spread on the marble operation platform was piled up on the center of the marble operation platform using an insertion board to cool uniformly. The operations were repeated and the temperature was measured, and when the temperature was cool to 26-27° C., the chocolate was put back into the paste pot and stirred well until the temperature of the chocolate was back to 29-30° C. After confirming that the tempering was successful, the paste was ready for casting.

Preparation and Application Test of Chocolate Block

Demoulding Ability Test

The chocolate paste was casted, cooled under 7-10° C. cold wind for 15 min, and demoulded. The number of naturally demoulded blocks was recorded (16 blocks/board).

Bloom Resistance Test

Chocolate blocks were place alternately at 22° C. and 32° C. (12 h at each temperature), and evaluated by sensory assessment after certain days. The bloom resistance was represented using—(good), * (loss of gloss), * (blooming), and * (severely blooming).

TABLE 4

| | Application Examples | | | | Comparative Application Examples | | | | | | | | | |
|---|---|---|---|---|---|---|---|---|---|---|---|---|---|---|
| | 1 | 2 | 3 | 4 | 1 | 2 | 3 | 4 | 5 | 6 | 7 | 8 | 9 | 0 |
| Test 1 | Demoulding ability test | | | | | | | | | | | | | |
| Demoulding ability | 16/16 | 16/16 | 16/16 | 16/16 | 7/16 | 6/16 | 1/16 | 10/16 | 5/16 | 16/16 | 16/16 | 7/16 | 10/16 | 16/16 |
| Test 2 | Bloom resistance test | | | | | | | | | | | | | |
| 1 week | — | — | — | — | — | — | ** | — | * | — | — | — | ** | — |
| 2 weeks | — | — | — | — | * | — | ** | — | ** | — | — | * | ** | — |
| 4 weeks | — | — | — | — | * | * | ** | — | ** | — | * | ** | *** | * |
| 6 weeks | — | — | — | — | ** | ** | ** | * | ** | — | * | *** | *** | ** |
| 8 wekks | — | — | — | — | ** | ** | *** | ** | *** | * | ** | *** | *** | *** |
| 10 weeks | — | — | — | — | *** | ** | *** | ** | *** | ** | ** | *** | *** | *** |

It can be seen from Table 4 that the application of the chocolate blocks added with the composition of the disclosure does not need tempering and does not require the seed crystal of a specific crystal form. These greatly simplify the chocolate preparation process. And the demoulding ability and bloom resistance of the chocolate blocks are improved significantly.

What is claimed is:

1. An oil and fat composition, wherein the composition comprises 50-99.5wt% triglyceride and 0.5-50wt% wax by the total weight of the composition,
the triglyceride is represented by the following formula (1),

(1)

in formula (1), $R_1$, R2 and R3 each are identical or different, and $R_1$, R2 and R3 refer to groups derived from straight-chain or branched-chain, saturated or unsaturated fatty acids having a carbon atom number of 12-28, wherein at least one of $R_1$, R2 and R3 refers to a group derived from a straight-chain or branched-chain, saturated or unsaturated fatty acid having a carbon atom number of 12-28; and wherein the wax meets the requirement that the weight ratio of wax esters (Wes)/alkanes (HCs) is >1, and the carbon atom number of the alkane is 15-27; and the wax meets the requirement that the total amount of fatty acids (FAs) and fatty alcohols (FALs) is less than 15wt%.

2. The composition of claim 1, wherein:
the composition comprises 55-95wt% triglyceride by the total weight of the composition; and/or,
the composition comprises 5-45wt% wax by the total weight of the composition; and/or,
the wax is at least one of a natural wax, a semi-synthetic wax or a synthetic wax.

3. The composition of claim 1, wherein:
the wax meets the requirement that the weight ratio of wax esters (Wes)/alkanes (HCs) is 1-30; and/or,
the wax meets the requirement that the total amount of fatty acids (FAs) and fatty alcohols (FALs) is less than 10 wt %.

4. The composition of claim 1, wherein:
in formula (1), $R_2$ refers to a group derived from a straight-chain or branched-chain, unsaturated fatty acid having a carbon atom number of 12-28, and $R_1$ and R3 independently refer to groups derived from straight-chain or branched-chain, saturated fatty acids having a carbon atom number of 12-28; and/or,
in formula (1), the total carbon atom number in $R_1$, $R_2$ and $R_3$ is 36-84; and/or,
in the triglyceride, the content of the fatty acid-derived groups having a total carbon atom number of 62 in $R_1$, $R_2$ and $R_3$ is at least 65 wt % by the total weight of the triglyceride; and/or,
in the triglyceride, the content of the fatty acid-derived groups having a total carbon atom number of 52-60 in $R_1$, $R_2$ and $R_3$ is 0-25wt % by the total weight of the triglyceride; and/or,
in the triglyceride, the total content of the fatty acid-derived groups having a total carbon atom number of 64 in $R_1$, $R_2$ and $R_3$ and having a total carbon atom number of 66 in $R_1$, R2 and R3 is less than 5 wt % by the total weight of the triglyceride; and/or,
in the triglyceride, the content of the group derived from the saturated fatty acid having a total carbon atom number of 22 is 55-72wt% by the total weight of the triglyceride; and/or,
the content of diglyceride is less than 10 wt % by the total weight of the triglyceride.

5. The composition of claim 1, wherein:
the triglyceride is obtained by a method comprising a transesterification step; wherein the transesterification is chemical transesterification or enzymatic transesterification; wherein the enzymatic transesterification is conducted by a triglyceride and a fatty acid or a derivative thereof in the presence of an immobilized lipase; and/or,
the composition consists of 50-99.5 wt % triglyceride and 0.5-50 wt % wax.

6. A food comprising the composition of claim 1.

7. The food of claim 6, wherein:
with respect to 100 parts by weight of the total weight of the food, the composition is 0.01-15 parts by weight; and/or,
the food is a food comprising cocoa butter and/or a cocoa butter equivalent and/or a cocoa butter replacer; and/or,
the food is chocolate or a food comprising chocolate.

8. The food of claim 6, wherein the food comprising cocoa butter and/or a cocoa butter equivalent and/or a cocoa butter replacer comprises 0.01-15 parts by weight of the composition, with respect to 100 parts by weight of the total weight of the cocoa butter and/or cocoa butter equivalent and/or cocoa butter replacer in the food.

9. The composition of claim 2, wherein the composition comprises 60-90 wt % triglyceride by the total weight of the composition; and/or, the composition comprises 10-40 wt % wax by the total weight of the composition; and/or, the natural wax is an animal wax or a plant wax; the synthetic wax is a chemically or enzymatically synthetic wax ester.

10. The composition of claim 2, wherein the wax is at least one selected from the group consisting of a bran wax, a sunflower wax, a beeswax, a candelilla wax, a carnauba wax, a nut wax and a fruit wax.

11. The composition of claim 3, wherein:
the wax meets the requirement that the weight ratio of wax esters (Wes)/alkanes (HCs) is 2- 28; and/or,
the wax meets the requirement that the total amount of fatty acids (FAs) and fatty alcohols (FALs) is less than 7 wt %.

12. The composition of claim 4, wherein:
in formula (1), $R_2$ refers to a group derived from a straight-chain, unsaturated fatty acid having a carbon atom number of 16-20, and $R_1$ and $R_3$ independently refer to groups derived from straight-chain, saturated fatty acids having a carbon atom number of 18-24; and/or,
in formula (1), the total carbon atom number in $R_1$, $R_2$ and $R_3$ is 52-68; and/or,
in the triglyceride, the content of the fatty acid-derived groups having a total carbon atom number of 62 in $R_1$, $R_2$ and $R_3$ is 68-95 wt % by the total weight of the triglyceride; and/or,
in the triglyceride, the content of the fatty acid-derived groups having a total carbon atom number of 52-60 in $R_1$, $R_2$ and $R_3$ is 5-23 wt % by the total weight of the triglyceride; and/or,
in the triglyceride, the content of the fatty acid-derived groups having a total carbon atom number of 64 in $R_1$, $R_2$ and $R_3$ and having a total carbon atom number of 66 in $R_1$, $R_2$ and $R_3$ is less than 4.5 wt % by the total weight of the triglyceride; and/or,
in the triglyceride, the content of the group derived from the saturated fatty acid having a total carbon atom number of 22 is 60-70 wt % by the total weight of the triglyceride; and/or,
the content of diglyceride is less than 5 wt % by the total weight of the triglyceride.

13. The composition of claim 1, wherein $R_2$ refers to a group derived from oleic acid, and $R_1$ and $R_3$ independently refer to groups derived from behenic acid.

14. The composition of claim 5, wherein:
the method further comprises: a molecular distillation step, which is conducted before or after the transesterification step; and/or,
the method further comprises: a fractionation step selected from a dry fractionation step or a solvent fractionation step; and/or,
the method further comprises: a refining step; and/or,
the fatty acid is at least one selected from the group consisting of straight-chain saturated fatty acids having a carbon atom number of 12-28; and/or,
the fatty acid derivative is at least one selected from the group consisting of esters formed from a straight-chain saturated fatty acid having a carbon atom number of 12-28 and an alcohol having a carbon atom number of 1-6; and/or,
the triglyceride is derived from a plant, derived from an animal, or obtained by modification of the oils and fats derived from a plant or an animal; and/or,
the triglyceride is derived from deep sea fish oil.

15. The composition of claim 5, wherein:
the fatty acid or a derivative thereof is at least one of behenic acid, methyl behenate or ethyl behenate; and/or
the triglyceride is derived from at least one of rice oil, sunflower seed oil, rape oil, palm oil, palm kernel oil, peanut oil, rapeseed oil, soybean oil, cottonseed oil, safflower seed oil, perilla seed oil, tea seed oil, olive oil, cocoa bean oil, tallowtree seed oil, almond oil, apricot kernel oil, tung seed oil, rubber seed oil, corn oil, wheat germ oil, sesame seed oil, castor seed oil, evening primrose seed oil, hazelnut oil, pumpkin seed oil, walnut oil, grape seed oil, borage seed oil, seabuckthorn seed oil, tomato seed oil, macadamia oil, coconut oil, cocoa butter or algae oil.

16. The composition of claim 5, wherein the triglyceride is derived from an oil and fat having a high content of oleic acid; which is at least one selected from the group consisting of high oleic sunflower seed oil, high oleic rapeseed oil and high oleic palm oil; or the triglyceride is derived from at least one of salmon oil or sardine oil.

17. The food of claim 7, wherein:
with respect to 100 parts by weight of the total weight of the food, the composition is 0.05- 10 parts by weight; and/or,
the food comprises 30-50 parts by weight of the cocoa butter and/or cocoa butter equivalent and/or cocoa butter replacer, with respect to 100 parts by weight of the total weight of the food.

18. The food of claim 7, wherein:
with respect to 100 parts by weight of the total weight of the food, the composition is 0.1-5 parts by weight; and/or,
the food comprises 10-20 parts by weight of cocoa powder, 30-50 parts by weight of sugar and 0.1-5 parts by weight of phospholipid, with respect to 100 parts by weight of the total weight of the food.

19. The food of claim 8, wherein the food comprising cocoa butter and/or a cocoa butter equivalent and/or a cocoa butter replacer comprises 0.05-10 parts by weight of the composition, with respect to 100 parts by weight of the total weight of the cocoa butter and/or cocoa butter equivalent and/or cocoa butter replacer in the food.

20. The food of claim 8, wherein the food comprising cocoa butter and/or a cocoa butter equivalent and/or a cocoa butter replacer comprises 0.1-5 parts by weight of the composition, with respect to 100 parts by weight of the total weight of the cocoa butter and/or cocoa butter equivalent and/or cocoa butter replacer in the food.

* * * * *